(12) United States Patent
Peters et al.

(10) Patent No.: US 9,803,528 B2
(45) Date of Patent: Oct. 31, 2017

(54) DEVICE FOR POST-TREATMENT OF EXHAUST GASES OF A LEAN BURNING INTERNAL COMBUSTION ENGINE

(75) Inventors: Axel Peters, Freising (DE); Marko Buder, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 417 days.

(21) Appl. No.: 12/682,224

(22) PCT Filed: Sep. 3, 2008

(86) PCT No.: PCT/EP2008/007177
§ 371 (c)(1),
(2), (4) Date: Jul. 12, 2010

(87) PCT Pub. No.: WO2009/049714
PCT Pub. Date: Apr. 23, 2009

(65) Prior Publication Data
US 2010/0300080 A1 Dec. 2, 2010

(30) Foreign Application Priority Data

Oct. 9, 2007 (DE) .................. 10 2007 048 560

(51) Int. Cl.
*F01N 3/00* (2006.01)
*F01N 3/20* (2006.01)
*F01N 13/14* (2010.01)

(52) U.S. Cl.
CPC ......... *F01N 3/2066* (2013.01); *F01N 13/141* (2013.01); *F01N 2610/02* (2013.01); *F01N 2610/1453* (2013.01); *Y02T 10/24* (2013.01)

(58) Field of Classification Search
CPC .. F01N 13/141; F01N 3/2066; F01N 2610/02; F01N 2610/1453
USPC ..................................... 60/286, 295
See application file for complete search history.

(56) References Cited

U.S. PATENT DOCUMENTS

| 6,010,668 | A * | 1/2000 | Lawrence | F01N 3/2839 422/176 |
| 6,553,755 | B2 * | 4/2003 | Hofmann et al. | 60/282 |
| 6,848,720 | B2 * | 2/2005 | Carns et al. | 285/123.15 |
| 7,065,958 | B2 * | 6/2006 | Funk et al. | 60/286 |
| 7,332,137 | B2 * | 2/2008 | DeSousa | F01N 3/2839 422/179 |

(Continued)

FOREIGN PATENT DOCUMENTS

DE 19856366 C1 4/2000
EP 1481719 A2 12/2004
(Continued)

*Primary Examiner* — Jason Shanske
*Assistant Examiner* — Matthew T Largi
(74) *Attorney, Agent, or Firm* — Maier & Maier, PLLC

(57) ABSTRACT

The invention relates to a device for post-treatment of exhaust gases of a lean burning internal combustion engine, in particular a diesel internal combustion engine, with an exhaust gas channel in which downstream of a reducing agent metering device there is a catalytic converter for selective catalytic reduction as an SCR catalytic converter. According to the invention, the exhaust gas channel section which, viewed in the exhaust gas flow direction, extends between the reducing agent metering device and the SCR catalytic converter, is made as a preferably air gap-insulated exhaust gas channel section.

8 Claims, 1 Drawing Sheet

(56) References Cited

U.S. PATENT DOCUMENTS

| | | | |
|---|---|---|---|
| 7,462,332 B2* | 12/2008 | Hardesty | F01N 3/2853 422/177 |
| 7,533,520 B2* | 5/2009 | Cheng et al. | 60/286 |
| 2002/0116916 A1 | 8/2002 | Hofmann et al. | |
| 2004/0258583 A1* | 12/2004 | Hardesty | F01N 3/2853 422/179 |
| 2006/0070236 A1* | 4/2006 | Barnard | F01N 3/28 29/890 |
| 2007/0065349 A1* | 3/2007 | Merry | 422/179 |
| 2007/0163241 A1* | 7/2007 | Meingast et al. | 60/286 |
| 2007/0243115 A1* | 10/2007 | Tsumagari et al. | 422/168 |
| 2008/0203725 A1* | 8/2008 | Willeke | 285/123.6 |
| 2009/0084094 A1* | 4/2009 | Goss | B01F 3/04049 60/301 |
| 2010/0212292 A1* | 8/2010 | Rusch et al. | 60/274 |

FOREIGN PATENT DOCUMENTS

| | | | | |
|---|---|---|---|---|
| EP | 1715153 A1 | 10/2006 | | |
| EP | 1760284 A2 | 3/2007 | | |
| WO | WO 2005073524 A1 * | 8/2005 | | F01N 3/08 |
| WO | WO 2006/022213 * | 3/2006 | | |
| WO | WO 2006022213 A1 * | 3/2006 | | |
| WO | WO 2006119824 A1 * | 11/2006 | | |

\* cited by examiner

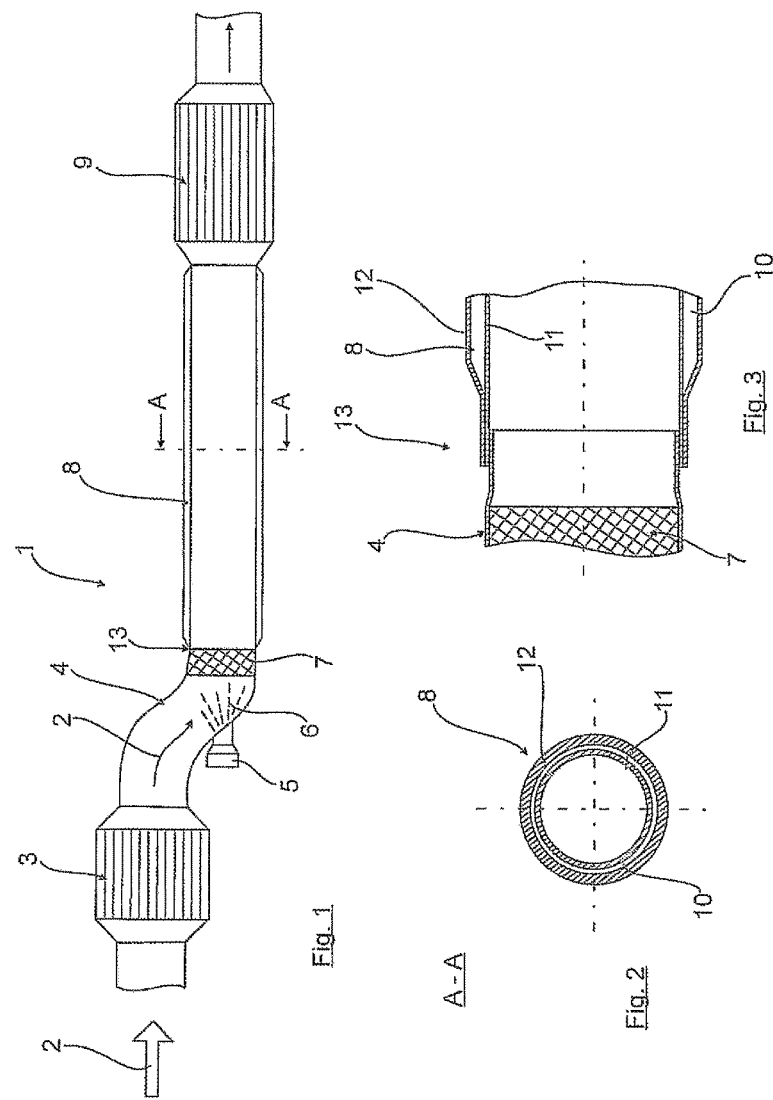

DEVICE FOR POST-TREATMENT OF EXHAUST GASES OF A LEAN BURNING INTERNAL COMBUSTION ENGINE

The invention relates to a device for post-treatment of exhaust gases of a lean burning internal combustion engine, in particular a diesel internal combustion engine.

BACKGROUND OF THE INVENTION

It is generally known that diesel internal combustion engines and lean burning gasoline internal combustion engines, in which fuel is injected directly into the combustion chamber in the cylinder, tend to produce higher NOx emissions due to the high oxygen excess. So-called selective catalytic reduction (SCR) is known for reducing the NOx content in the exhaust gas of these internal combustion engines. In the exhaust gas channel, a reducing agent is injected into the exhaust gas flow and converts the nitrogen oxides contained in the exhaust gas into harmless nitrogen and water in the presence of oxygen at the reducing catalytic converter. For example, ammonia solutions or urea solutions are added as the reducing agent.

However, the problem with these devices is that selective catalytic reduction can be reliably carried out effectively only at very high exhaust gas temperatures. Thus, at overly low temperatures in the exhaust gas line, unwanted urea deposits can occur upstream of the SCR catalytic converter; this clearly reduces the efficiency of selective catalytic reduction.

To remedy this disadvantage, a plurality of documents (DE 10 2004 004 738 A1, EP 1 712 756 A1, US 2006/0275192 A1, WO 2006/014129 A1) have already disclosed inserting into the exhaust gas channel an inner pipe, in which a static mixer is held or which acts as a type of baffle around which exhaust gas flows in the exhaust gas channel in the gap between the inner pipe and outer wall, with metering of the reducing agent taking place into the region of the inner pipe. This measure is intended to result in the site at which the reducing agent is supplied having the desired high temperature. These mechanical configurations are, however, relatively complex in terms of production technology and component engineering and lead to considerable flow losses and undesirable exhaust gas back-pressure in the exhaust gas line.

Furthermore, DE 198 56 366 C1 discloses, in order to avoid overly high temperatures in the region of the injection valve for the reducing agent for selective catalytic reduction, enclosing the injection valve by means of a double-wall valve holding body which is directly connected to the exhaust gas line so that compressed air can be blown into the air gap between the outer wall and the inner wall of the valve holding body to cool the injection valve. This results in aqueous urea solutions in particular being prevented from crystallizing out due to overly high injection valve temperatures. In conjunction with the embodiment shown in FIG. 2 of this prior art, a structure is furthermore described in which the above-described injection valve discharges into a double-wall exhaust gas channel. Sealing and insulating elements are to be provided here in a complicated manner at the orifice site of the injection valve in order to prevent the reducing agent from traveling into the gap between the two pipe walls.

The object of this invention is therefore to make available a device for post-treatment of exhaust gases of a lean burning internal combustion engine, in particular a diesel internal combustion engine, by means of which reliable and effective selective catalytic reduction of nitrogen oxides in the exhaust gas flow is possible in a manner which is simple in terms of component engineering and production technology.

SUMMARY OF THE INVENTION

According to the invention, it is provided that the exhaust gas channel section, viewed in the flow direction in the region between or downstream of the reducing agent metering device as far as to the SCR catalytic converter, is made as a thermally insulated, particularly an air gap-insulated exhaust gas channel section. The effect of such an exhaust gas channel section, in particular an air gap-insulated exhaust gas channel section, is that the inner, gas-carrying pipe of the air gap-insulated exhaust gas channel section heats up rapidly, so that it becomes hotter; this is advantageous for selective catalytic reduction. At the same time, the gas-carrying, inner pipe of the air gap-insulated exhaust gas channel section is protected very effectively against cooling from the outside, for example by splash water or the like.

According to one especially preferred configuration, for this purpose, the air gap-insulated exhaust gas channel section is formed by an intermediate pipe which is made as a separate component and which can be easily produced, for example, by a double-wall pipe arrangement in which an internal, gas-carrying inner pipe is surrounded by an outer pipe which has a given gap distance to the inner pipe. Preferably, the inner pipe has a smaller wall thickness than the outer pipe, by which it is ensured that the inner pipe heats up to the desired temperature more quickly, while the outer pipe, which has a higher thermal mass, is designed such that the flow of force is routed via the latter. That is to say that, for example, proceeding from the single-wall exhaust gas channel section in which preferably the metering device is supported, the flow of force is routed via the outer pipe. This structure can be implemented both with an integral exhaust gas channel section which is double-wall or also with an intermediate pipe made as a separate component.

This component, which is made as a separate intermediate pipe, moreover, can be integrated very easily into the exhaust gas line of the internal combustion engine, for example, by welding in an overlapping region. Linking to the adjacent exhaust gas channel sections can, for example, take place in the region of the SCR catalytic converter via a gas-tight flange connection. Linking in the direction to the reducing agent metering device takes place, for example, via an overlapping connection which is made as a positive plug-in connection, and in which the two sections, which have been inserted into one another, are peripherally welded gas-tight to one another.

A configuration is especially preferred in which in the exhaust gas line there is furthermore a static mixer to which the reducing agent metering device is connected downstream, so that the sequence of reducing agent metering device, static mixer, air gap-insulated exhaust gas channel section, and SCR catalytic converter arises with which optimized selective catalytic reduction can be carried out in a manner which is simple in terms of component engineering. This is due, specifically, to the circumstance that after metering of the reducing agent, it can be extremely finely atomized by a static mixer which can optionally also be formed analogously by another, for example, driven mixing device, so that the reducing agent travels extremely finely distributed in the exhaust gas flow to the SCR catalytic converter, via an air gap-insulated exhaust gas channel section so that the high temperature necessary for effective and optimum catalytic reduction can be reliably maintained.

The static mixer itself, in this case, can be a component of an intermediate pipe which is made as a separate part, and specifically, can be inserted there on the end side into the end region of the intermediate pipe facing the reducing agent metering device. Alternatively, the static mixer can also be located directly downstream of the reducing agent metering device in a single-wall exhaust gas channel wall section bearing the metering device.

It should be expressly noted again at this point that it is an essential advantage of the invention that with it an embodiment can be devised in which the reducing agent metering device, optionally in combination with a static mixer, can be arranged in a manner which is simple in terms of component engineering and production technology in the single-wall exhaust gas pipe region, to which then the double-wall air gap-insulated exhaust gas channel is directly connected to which then in turn the SCR catalytic converter is connected. A structure is hereby made available which is simple and thus more economical in terms of component engineering and also production technology and which, moreover, has high reliability. In particular, with a reducing agent metering device, particularly an injection valve, in the single-wall region of the exhaust gas channel a much simpler arrangement and sealing of the orifice region of the injection valve in the exhaust gas channels can be achieved than is the case in a double-wall structure.

For the case in which the static mixer is a component of the intermediate pipe which is made as a separate component, it can be advantageously integrated as a module into a premounting assembly; this reduces installation costs when the exhaust gas line is assembled.

A structure is especially preferred in which a diesel particle filter is connected upstream of the reducing agent metering device in conjunction with the diesel internal combustion engine so that in this diesel particle filter additional diesel-specific pollutants can be filtered out conventionally.

BRIEF DESCRIPTION OF THE DRAWINGS

FIG. 1 shows a highly simplified schematic of a device according to the invention for post-treatment of exhaust gases of a lean burning internal combustion engine, FIG. 2 schematically shows a section along line A-A of FIG. 1, and FIG. 3 schematically shows the overlapping region of a single-wall exhaust gas channel section with a double-wall intermediate pipe.

DETAILED DESCRIPTION OF THE PREFERRED EMBODIMENTS OF THE INVENTION

FIG. 1 schematically shows the device 1 according to the invention for post-treatment of exhaust gases of a diesel internal combustion engine, for example, (not shown) as a lean burning internal combustion engine. This device 1, viewed in the flow direction of the exhaust gas 2, encompasses a diesel particle filter 3 to which a single-wall exhaust gas channel section 4 is connected in which an injection valve 5 is held and discharges, by means of which the reducing agent, for example a urea solution 6, can be injected into the exhaust gas flow 2.

A static mixer 7, shown here only extremely schematically, is connected directly downstream of the injection valve 5 and, for example, is located with a mixer ring likewise in the single-wall exhaust gas channel section 4 and in particular, is radially welded peripherally in the latter. Extremely fine distribution of the charged urea solution 6 into the exhaust gas flow 2 takes place by means of this static mixer 7. This reducing agent-exhaust gas mixture then flows along a double-wall intermediate pipe 8, which is made as a preferably separate component, to the SCR catalytic converter 9 in which then catalytic reduction takes place.

The intermediate pipe 8 forming the air gap 10 that has a gas-carrying inner pipe 11, which is surrounded by the outer pipe 12, ensures that the gas-carrying inner pipe 11 heats up more rapidly and thus becomes hotter, at the same time also being protected against cooling from the outside, for example, by splash water or the like. The sequence shown here: diesel particle filter 3, injection valve 5, static mixer 7, air gap-insulated double-wall intermediate pipe 8, and SCR catalytic converter 9, viewed in the exhaust gas flow direction, makes available a device 1 that is simple in terms of component engineering and thus production technology and by means of which selective catalytic reduction can be effectively carried out. In particular, the arrangement of the injection valve 5 and optionally of the static mixer 7 in the region of the single-wall exhaust gas channel section 4 allows simple mounting and arrangement of components on the exhaust gas line.

As can be taken especially from FIG. 3, which shows an enlarged cross section of the transition region of the single-wall exhaust gas channel section 4 into the intermediate pipe 8, this transition region can be made as an overlapping region 13 in which here, for example, the end of the single-wall exhaust gas channel section 4 is positively inserted into the gas-carrying inner pipe 11 of the intermediate pipe 8 with a given insertion depth. The components are then radially welded peripherally to one another here for a gas-tight connection. As can moreover be further taken from FIG. 3, the air gap 10 of the intermediate pipe 8 is constructed here by the outer pipe 12, viewed in the axial direction, being connected on the end side to the inner pipe 11 in a positive contact connection or by their being radially welded peripherally to one another there.

The opposite linking in the direction to the SCR catalytic converter 9 preferably takes place by means of a gas-tight flange connection which is, however, not further detailed.

The invention claimed is:

1. An assembly for treating the exhaust gases of an internal combustion engine, comprising:
    an exhaust line having an upstream side and a downstream side, and a catalytic converter disposed proximate the downstream side of said exhaust line;
    a static mixer disposed proximate the upstream side of said exhaust line between said engine and said converter, in the path of exhaust gases flowable therethrough;
    means disposed upstream of said static mixer for injecting a spray of a reducing agent into a segment of flow of said exhaust gases passing through said static mixer; and
    an intermediate conduit between said static mixer and said converter, wherein said intermediate conduit includes an inner pipe, an outer pipe surrounding the inner pipe, and an air gap between the inner pipe and the outer pipe along an axial direction of the intermediate conduit, wherein an end of the upstream side of said exhaust line is configured to be positively inserted into the inner pipe of the intermediate conduit, wherein the inner pipe has a constant diameter along the axial direction of the intermediate conduit, wherein a length of the air gap of the intermediate conduit along the axial direction is greater than the diameter of the inner pipe.

2. The assembly according to claim 1 wherein said intermediate conduit is provided with a wall thickness greater than a wall thickness of said exhaust line.

3. The assembly according to claim 1 wherein said static mixer is functional to finely atomize the reducing agent injected therethrough to be finely distributed in the exhaust gas flow received in the catalytic converter.

4. The assembly according to claim 1 wherein said injecting means is connectable to a source of a reducing agent under pressure.

5. The assembly according to claim 1 including a diesel particle filter disposed in said exhaust gas line upstream of said injecting means.

6. The assembly according to claim 1 wherein said exhaust gas line includes a bent portion upstream of said static mixer and said injecting means comprises a nozzle supported in said bent portion and directed to said static mixer.

7. The assembly according to claim 6 wherein said nozzle is disposed substantially coaxially with a portion of said exhaust gas line disposed between said static mixer and said converter.

8. The assembly according to claim 6 including a diesel particle filter.

* * * * *